Patented Aug. 14, 1928.

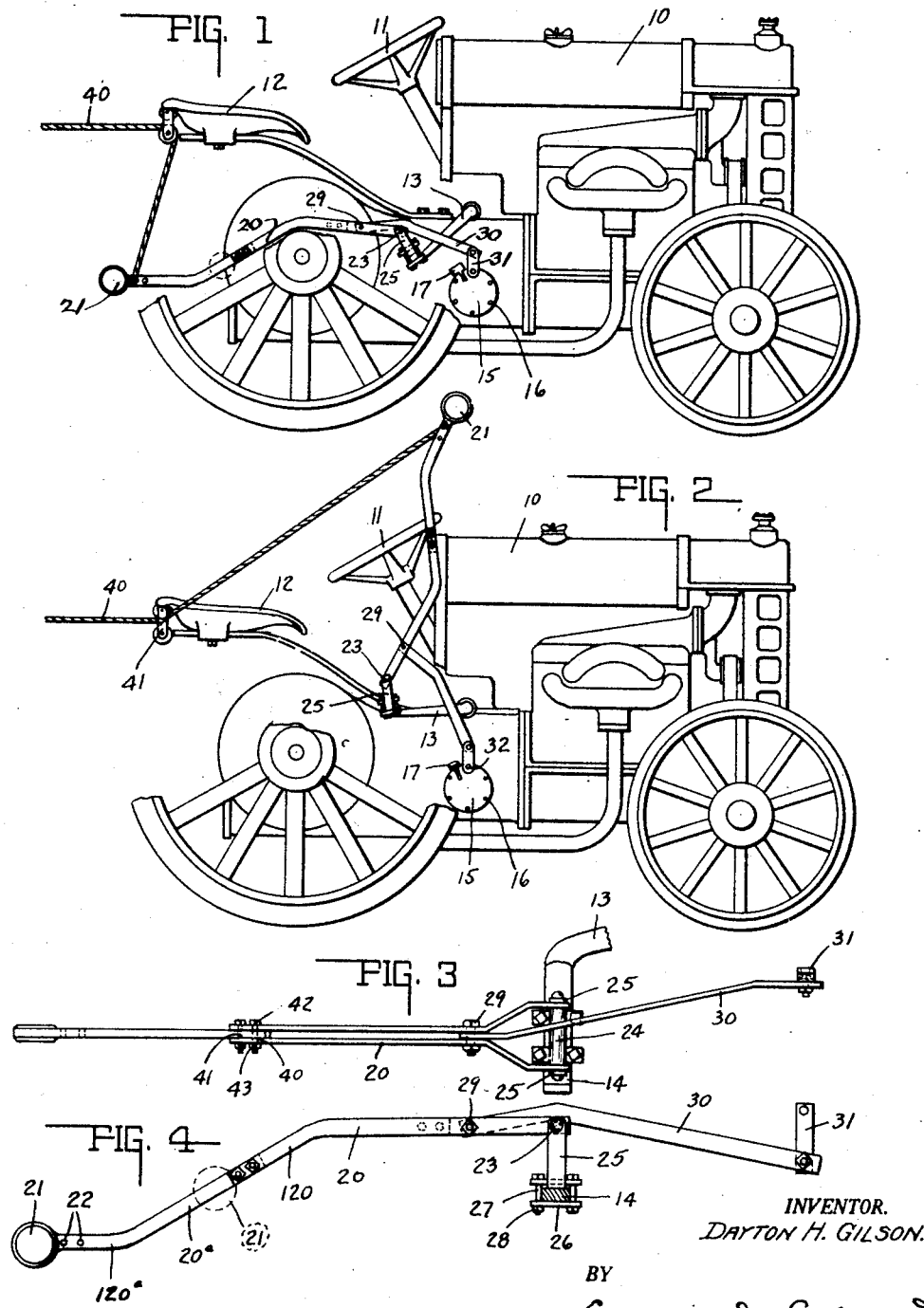

1,680,780

UNITED STATES PATENT OFFICE.

DAYTON H. GILSON, OF RUSHVILLE, INDIANA.

LEVER ATTACHMENT FOR REMOTE CLUTCH CONTROLS.

Application filed April 12, 1923. Serial No. 631,569.

This invention relates to a lever attachment for a self-propelled tractive vehicle commonly known as a tractor. The chief object of the invention is to provide means which may be readily attached to, or detached from the usual power controlling means of the tractor, and which may be operable remotely from the tractor, as from another vehicle or agricultural implement or the like, propelled by said tractor.

The chief feature of the invention consists in the detailed construction of the attachment, whereby the same may be incorporated and so associated with the standard parts of a tractor, particularly of the Fordson type, such that the several power controlling parts of said tractor will be actuated by said attachment when the attachment is remotely controlled.

Another feature of the invention consists in the arrangement of the several parts of the attachment, whereby a single cable is adapted to be operated from a remote point and to move the usual power controlling means into the power connected and disconnected positions.

Still a further feature of the invention consists in the arrangement of the several parts of the attachment and its association with the standard parts of the tractor so that an over-center locking construction is secured, which when fully released is maintained in one operative locking position by the springs included in the power control of the tractor, per se, and in the other position by a weight associated with the lever or the weight of the latter. After the lever has been moved over-center by the single cable and released, the lever will continue its movement into the desired position through either of the before mentioned means.

Another feature of the invention consists in the construction of the lever attachment so that it may be more convenient to manually operate the controlling lever by hand for field work and the like.

A further feature of the invention is the retention of the flexibility of control included in the Fordson tractor whereby with the attachment the Fordson may be remotely controlled and "inched along" if desired.

Another feature of the invention is the arrangement of the several parts whereby when the Fordson is coupled with the thrasher or the like the former may be controlled from said thrasher and the like and to any degree desired, that is anywhere from full speed or power to slow speed or little power. This action is known as slipping or partially slipping the clutch.

The full nature of this invention will be understood from the accompanying drawings and the following description and claims.

In the drawings Fig. 1 is a side elevational view of a Fordson tractor with parts broken away to show other parts in detail, and particularly the invention and the method of mounting the same upon the structure, the parts in this figure being shown in the disconnected power position. Fig. 2 is a similar view of the same parts, but in the power connected position. Fig. 3 is an enlarged plan view of the attachment and its mounting upon the immediately adjacent tractor parts. Fig. 4 is a side elevational view of the construction shown in Fig. 3.

In the drawings there is illustrated a Fordson tractor 10 having a steering wheel 11 and the usual seat 12. The tractor 10 is also provided with a clutch operating lever arm 13 having a foot pedal portion 14 shown in Fig. 3. Adjacent the foot pedal carried by the tractor, is a hand hole cover plate 15 suitably secured thereto by the bolts 16, and carried by said plate is a step or foot rest 17. The plate is removed and replaced by a power pulley when desired. All of the foregoing is standard construction of the Fordson tractor, and usually of other tractors.

It is to be remembered that associated with the foot pedal lever 13 is a clutch, not shown in the drawings, and said clutch is adapted to connect the propeller shaft with the engine crank shaft, by means of a plurality of springs and friction plates, both of the latter being included in the clutch construction. In normal operation, the operator is seated upon the seat 12 and steers the tractor by means of the wheel 11. The operator moves the foot pedal 14 from the position shown in Fig. 1 to the position shown in Fig. 2 and the springs included in the clutch maintain the lever in the elevated position, as shown in Fig. 2. While the tractor is running, the operator keeps his foot upon the stationary foot rest 17 until such time as he desires to stop the tractor, whereupon the lever 13 is depressed by the operator placing his foot upon the pedal portion 14 and moving the same from the position shown in Fig. 2 to the position shown in Fig. 1.

All of the foregoing is the usual operation. The full control is adjusted as desired and tractor speed variation or power variation can be secured through controlling the clutch.

The particular novelty in the present invention consists in associating an attachment with several of the foregoing parts so that the normal operation of said parts will be secured by means of the attachment and from a distance either forwardly or rearwardly of the tractor as desired. It is to be understood that the hereinbefore described remote control is desirable in at least two instances. In the first instance, the tractor does not move, but develops power, and this power may be utilized to drive a thrashing machine, a separator or other power operable devices. This is usually done by belting the tractor through the replacable pulley to the power operable device. With the present invention, the power applied by the tractor to the power operable device can be controlled from the power operable device, whether stationary or movable by and with the tractor and when positioned forwardly or rearwardly of said tractor thus obviating dangers incident to the control of the power supplying machine at the same.

The second instance wherein the device is desirable is when the tractor is moving. In this instance, the movement may be of two kinds. The operator upon a power operable machine, such as a binder or group of binders connected together and propelled by the tractor, has control of the movement of the tractor, the steering being done by another operator, such as a child. When the second operator is not desired, the device is utilized in the same manner as just described, and in addition thereto there is provided means for steering the tractor from the same point by the power controlling operator and such remote control, including the broad idea of remote clutch control, is illustrated and described in my prior Patent No. 1,421,076.

Reference will now be had to Figs. 3 and 4. In said figures one form of the invention is illustrated in detail, and essentially consists of a link and lever construction as follows: The bifurcated lever 20 carries at one end a weight 21 and a pair of openings 22. The opposite end is pivotally supported at 23 by a pivot 24, which pivot 24 is supported by a U-shaped strap 25. The U-shaped strap 25 is adapted to be positioned adjacent the foot pedal 14 so that the intermediate portion of said strap bears upon the upper surface of the pedal. The foregoing forms a stirrup for the foot when foot control is desired. Two pairs of transverse straps 26 or their equivalents such as a U-strap or the like straddle the intermediate portion of the U-shaped member 25 and the foot pedal 14 and are secured in rigid relation with said strap and foot pedal by the bolts 27 and nuts 28. Thus, the U-shaped strap forms a pivotal support upon the extended foot pedal lever 13 for the controlling lever 20.

Intermediate the ends of the controlling lever 20, and preferably near its pivotal support and at 29, there is pivotally supported a link 30 which is secured intermediate the bifurcated portion of the lever 20 and is also offset laterally, as shown in Fig. 3, as well as angled as shown in Fig. 4. The other end of the link 30 is pivotally supported by a strap 31 and the other end of the strap 31 is secured at 32 by one of the original bolts 16 securing the plate 15 to the tractor. In this manner, the remote control construction is secured to the tractor without discarding a single Fordson part. It is here noted that in Fig. 4 the member 31 is extended upwardly instead of downwardly, as shown in Figs. 1 and 2, which latter figures show said part in its neutral position, the position shown in Fig. 4 being the opposite position by reason of the position of the inventor's name.

When the lever 20 is moved over-center towards the front of the tractor, the springs in the clutch act through the clutch pedal lever 13 to move the clutch from the position shown in Fig. 1 into the position shown in Fig. 2 and move said lever 20 and associated parts into the position shown in the second figure. When it is desired to disconnect the power, the lever 20 is moved from the position shown in Fig. 2 into the central or neutral position, not shown, and after passing the central position the weight 21 will act upon said lever 20, and carry the lever the remainder of the distance for complete power disconnection. As shown clearly in Fig. 1 and Fig. 4, the lever 20 is offset intermediate its ends by the portion 120 so that the lever will not engage the axle of the driving wheels of the tractor, and this increases the distance between the seat 12 and the weight 21 which permits the clutch to engage.

The means for shifting the lever from the position shown in Fig. 1 to that shown in Fig. 2 and vice versa, is herein illustrated as a single cable 40. The single cable 40 passes through a single swivel pulley construction 41 suitably secured in depending relation from the seat 12 so as not to interfere with seating comfort, when the tractor is to be used in its usual manner. One end of the cable 40 is secured to the outer end of the lever 20 through the holes 22. Thus, a quick pull upon the cable 40, when the parts are positioned as shown in Fig. 1, which is the power disconnected position, will raise the lever 20 in opposition to the weight 21 until said lever is over-center, whereupon the clutch springs, if the cable is released immediately following the pull, act through the lever 13, will carry the construction the remainder of the distance into the position shown in Fig. 2. When it is desired to disconnect the power, a quick pull upon the cable 40 will move the lever 20 upon its pivot 23 until it finally moves over-center, whereupon when the cable is released the weight 21 continues the further movement of said lever. The parts then assume the position shown in Fig. 1. It is to be remembered that the lever 20 is mounted upon a shifting or oscillating pivot carried by the foot pedal 14.

With the aforesaid construction, it is possible to remotely control the application of power to a tractor by a single cable associated with the attachment that is connected to standard parts of the tractor, without any change in the latter.

In order to permit manual control of the lever attachment, which is sometimes particularly desirable in field work, the lever construction hereinbefore described is made in such a manner that the same may be shortened in this way. The lever 20 having the angular portion 120, is made of two parts, one part of which is 20ª and the other part of which is angular thereto and is indicated by the numeral 120ª. The bifurcated lever 20 adjacent the junction with the portion 20ª is suitably apertured as at 40 and the adjacent end of the extension 20ª is similarly apertured at 41. The pairs of apertures 40 and 41 are adapted to register and the bolts 42, by means of the nuts 43, secure the extension 20ª and 120ª to the lever 20 and 120, as shown, and in rigid relationship. When it is desired to shorten the lever 20, the extension 20ª and 120ª is removed from the lever 20 having the angular portion 120 and the holes 22 are positioned so as to register with the openings 40 hereinbefore described, and the bolts 42 thereupon secure the lever extension to the lever, as shown by the dotted lines in Fig. 4 and in Fig. 1. If desired, the lever 20 intermediate its ends, and preferably adjacent the pivotal support 29, may be apertured, as indicated by the dotted lines in Fig. 4. When thus apertured, the free end of the lever extension 20ª will be positioned between the lever side 20 with the openings 41 registering, and in this position the weight 21 and the extension 120ª would extend upwardly toward the seat instead of downwardly, as shown by the dotted lines in Fig. 4. Likewise the additional apertures adjacent support 29 provide for individual adjustment when required, since all clutches are not uniform in their power.

The invention claimed is:

1. The combination of a tractor having a clutch operating foot pedal lever swingingly supported, a bar construction pivotally supported by said lever and having an end normally positioned above the swinging support of the lever when the clutch lever is in its uppermost position, a link pivotally connected to said bar construction intermediate the ends thereof and pivotally supported by the tractor beneath the swinging support of the clutch lever, said link being relatively movable towards and away from the foot pedal portion of the clutch lever in the swinging movement of the clutch lever, and a single control line connected to the bar construction for starting and stopping the tractor through uni-directional pull thereof.

2. The combination with a tractor having a spring actuated clutch operating lever, of a remote control toggle attachment pivotally supported by said clutch lever and by the tractor for operating the latter, the spring in the clutch moving said control lever attachment in one direction after passing over center, and a weighted extension for moving said attachment in the opposite direction after passing over center.

3. A remote control means for a tractor having a swingingly mounted clutch lever normally movable from neutral to clutch engaging position, comprising a bar link pivotally mounted at one end and connected to the clutch pedal and swingable therewith, other bar means pivotally mounted at one end and to the tractor having a pivotal connection said bar being extended beyond the pivotal connection with said lever, and a control line connected to the extension of said bar for controlling the movements of the latter.

4. An attachment for a tractor having a spring actuated clutch, and a clutch lever pedal normally movable from neutral to clutch engaged position, comprising a U-shaped strap rigidly secured to said clutch pedal, a pair of straps each pivotally supported at one end by said U-shaped strap, a single member pivotally supported at one end by the tractor and including an offset portion intermediate its ends, said straps and member having a pivotal connection therebetween, a weighted extension beyond said pivotal connection, and a single non-rigid line connected to said extension for remotely controlling the tractor.

5. The combination of a tractor having a spring actuated clutch and a lever therefor normally movable from neutral into clutch engaged position, comprising a toggle attachment having one leg portion pivotally mounted upon and anchored to the tractor, and another leg portion pivotally mounted upon said lever and movable therewith, said leg portions being pivotally connected together, and an extension from the pivotal connection for shifting said toggle legs from one over-center position to the other for maintaining the lever in the desired position.

6. The combination with a tractor having a spring actuated clutch and a pivotally mounted control lever therefor normally movable by the clutch spring from neutral to engaged position, of attachment means connected to the lever for starting and stopping the tractor, and a control line attached to said means for operating the same when uni-directional movement is imparted to said line, characterized by said attachment means being maintainable by said line in an intermediate position when suitable tension is maintained thereon, additional tension moving said lever into the neutral position and release of tension automatically returning said lever into clutch engaging position from said intermediate position.

7. A vehicle having the usual depressible clutch pedal; a bar pivoted at one end to said pedal and capable of having its free end moved above or below the horizontal plane of said pedal, a link disposed above said pedal and pivoted at one end to said bar inwardly of the ends of the latter, the opposite end of said link secured to said vehicle below the horizontal plane of said pedal and capable of pivotal and oscillating movements, and means for moving the free end of said bar.

8. A vehicle having the usual depressible clutch pedal, a bar pivoted at one end to said pedal, a link pivoted at one end to said bar inwardly from the ends thereof and pivotally and oscillatably secured at its other end to said vehicle below the plane of said pedal, and means for moving the outer end of said bar.

In witness whereof, I have hereunto affixed my signature.

DAYTON H. GILSON.